US008600060B2

(12) United States Patent
Priestley et al.

(10) Patent No.: US 8,600,060 B2
(45) Date of Patent: Dec. 3, 2013

(54) TELECOMMUNICATIONS DEVICE SECURITY

(75) Inventors: Mark Priestley, Kew (GB); Timothy James Wright, Reading (GB); Caroline Jessica Belrose, Marlborough (GB); Nicholas Bone, Thatcham (GB); James Irwin, Newbury (GB)

(73) Assignee: Vodafone Group PLC, Newbury, Berkshire (GB)

( * ) Notice: Subject to any disclaimer, the term of this patent is extended or adjusted under 35 U.S.C. 154(b) by 610 days.

(21) Appl. No.: 12/373,874

(22) PCT Filed: Jul. 13, 2007

(86) PCT No.: PCT/GB2007/002634
§ 371 (c)(1),
(2), (4) Date: Mar. 2, 2010

(87) PCT Pub. No.: WO2008/007111
PCT Pub. Date: Jan. 17, 2008

(65) Prior Publication Data
US 2010/0195833 A1 Aug. 5, 2010

(30) Foreign Application Priority Data

Jul. 14, 2006 (GB) .................................. 0614063.6

(51) Int. Cl.
*H04L 9/08* (2006.01)
(52) U.S. Cl.
USPC ................ 380/273; 380/277; 713/166; 726/1
(58) Field of Classification Search
USPC ......................................................... 380/273
See application file for complete search history.

(56) References Cited

U.S. PATENT DOCUMENTS 7,398,532 B1 * 7/2008 Barber et al. .................. 719/328
7,694,328 B2 * 4/2010 Joshi et al. ........................ 726/2

(Continued)

FOREIGN PATENT DOCUMENTS

| WO | 2004/082310 | 9/2004 |
| WO | 2005/045735 | 5/2005 |
| WO | 2005/091108 | 9/2005 |

OTHER PUBLICATIONS http://www.trustedcomputinggroup.org/files/resource_files/8791DAF9-1D09-3519-ADC146DBA39E8A6D/Final_spec_overview_CTIA_sept_13.pdf, 2006.*

(Continued)

*Primary Examiner* — Kambiz Zand
*Assistant Examiner* — Yonas Bayou
(74) *Attorney, Agent, or Firm* — Workman Nydegger

(57) ABSTRACT

A mobile terminal for use with a cellular or mobile telecommunications network includes a normal execution environment (operating system) (30) and a secure execution environment (32) comprising a Mobile Trusted Module (MTM). The mobile terminal enables the software of the terminal in the secure execution environment (32) to be updated. The terminal 1 may be provided with minimal software initially in the secure execution environment (32), and is operable to subsequently update the software by over the air transmission of software. Also disclosed is a method for managing rights in respect of broadcast, multicast and/or unicast (downloaded) data, relevant in particular to managing access to a broadcast video data stream complying with a mobile digital broadcast scheme. The method defines a service protection platform implemented on mobile terminals having both normal execution environment (i.e. the operating system) and secure execution environment. Service protection is provided by separating the operation of service protection application components into those that operate in the normal environment and those that are adapted to execute only in the secure execution environment. Making the secure execution environment application component interchangeable allows the method to be adapted to any of a number of service protection protocols or "profiles" by downloading only the secure execution environment application component.

50 Claims, 6 Drawing Sheets

(56) References Cited

U.S. PATENT DOCUMENTS

| | | |
|---|---|---|
| 7,917,749 B2 * | 3/2011 | Ginter et al. ............... 713/164 |
| 7,925,898 B2 * | 4/2011 | Shear et al. ............... 713/194 |
| 2002/0073326 A1 * | 6/2002 | Fontijn ............... 713/190 |
| 2002/0099946 A1 * | 7/2002 | Herbert et al. ............... 713/193 |
| 2003/0163718 A1 * | 8/2003 | Johnson et al. ............... 713/193 |
| 2004/0003288 A1 * | 1/2004 | Wiseman et al. ............... 713/201 |
| 2004/0054918 A1 * | 3/2004 | Duri et al. ............... 713/200 |
| 2004/0133640 A1 * | 7/2004 | Yeager et al. ............... 709/204 |
| 2004/0237082 A1 * | 11/2004 | Alcazar et al. ............... 717/174 |
| 2005/0125661 A1 * | 6/2005 | Vaidyanathan ............... 713/166 |
| 2005/0210287 A1 * | 9/2005 | Paatero ............... 713/201 |
| 2005/0213766 A1 * | 9/2005 | Goss ............... 380/277 |
| 2007/0192825 A1 * | 8/2007 | Frank et al. ............... 726/1 |
| 2008/0047024 A1 * | 2/2008 | Frank et al. ............... 726/34 |

OTHER PUBLICATIONS http://www.trustedcomputinggroup.org/files/resou rce_files/8791 DAF9-1 D09-3519-ADC146DBA39E8A6D/Final_spec_overview_CTIA_sept_13.pdf, 2006.*

* cited by examiner

TELECOMMUNICATIONS DEVICE SECURITY

FIELD OF THE INVENTION

The present invention relates to a terminal for use with a cellular telecommunications network, having a secure execution environment in which security functions trusted by a third party are performed. The present invention also relates to a method of providing security functions trusted by a third party in a terminal for use with a cellular or mobile telecommunications network. The present invention further relates to method for managing rights in respect of broadcast, multicast and/or unicast (downloaded) data. In particular, the invention may be applied to a broadcast video data stream complying with a digital broadcast scheme such as DVB-T or DVB-H.

BACKGROUND OF THE INVENTION

A Trusted Platform Module (TPM) is a security module defined by the Trusted Computing Group (TCG) to provide protected security functions to computing platforms. Typically, it is implemented as an additional stand-alone chip attached to a PC motherboard. However, TPMs may be implemented in hardware or software.

A TPM can be considered to include various building blocks. A building block of a trusted platform TPM component is trusted to work properly without additional oversight. Trust in these components is derived from good engineering practices, manufacturing process and industry review.

Example building block components may include:—
Input/Output (I/O)

The I/O component manages information flow over a communications bus. It performs protocol encoding/decoding suitable for communication over external and internal buses. It routes messages to appropriate components. The I/O component enforces access policies associated with the Opt-In component (described below) as well as other TPM functions requiring access control.

Non-Volatile Storage

Non-volatile storage is used to store Endorsement Key (EK), Storage Root Key (SRK), owner authorisation data and persistent flags. Platform Configuration Registers (PCR) can be implemented in either volatile or non-volatile storage. They are reset at system start or whenever the platform loses power. TCG specifies a minimum number of registers to implement (16). Registers 0-7 are reserved for TPM use. Registers 8-15 are available for operating system and application use.

Attestation Identity Key (AIK)

Attestation Identity Keys must be persistent, but it is recommended that AIK keys be stored as Blobs (binary large objects) in persistent external storage (outside the TPM), rather than stored permanently inside TPM non-volatile storage. TCG hopes TPM implementers will provide ample room for many AIK Blobs to be concurrently loaded into TPM volatile memory as this will speed execution.

Program Code

Program code contains firmware for measuring platform devices. Logically, this is the Core Root of Trust for Measurement (CRTM). Ideally, the CRTM is contained in the TPM, but implementation decisions may require it be located in other firmware.

Random Number Generator (RNG)

The TPM contains a true random-bit generator used to seed random number generation. The RNG is used for key generation, nonce creation and to strengthen pass phrase entropy.

Sha-1 Engine

A Sha-1 message digest engine is used for computing signatures, creating key Blobs and for general purpose use.

RSA Key Generation

TCG standardises the RSA5 algorithm for use in TPM modules. Its recent release into the public domain combined with its long track-record makes it a good candidate for TCG. The RSA key generation engine is use to create signing keys and storage keys. TCG requires a TPM to support RSA keys up to a 2048-bit modulus, and mandates that certain keys (the SRK and AIKs, for example) must have at least a 2048-bit modulus.

RSA Engine

The RSA engine is used for signing with signing keys, encryption/decryption with storage keys, and decryption with the EK. The TCG committee anticipates TPM modules containing an RSA engine will not be subject to import/export restrictions.

Opt-In

The Opt-In component implements TCG policy requiring TPM modules are shipped in the state the customer desires. This ranges from disabled and deactivated to fully enabled; ready for an owner to take possession. The Opt-In mechanism maintains logic and (if necessary) interfaces to determine physical presence state and ensure disabling operations are applied to other TPM components as needed.

Execution Engine

The execution engine runs program code. It performs TPM initialization and measurement taking.

The TCG also has a Mobile Phone Working Group, standardising a version of the TPM—Mobile Trusted Module (MTM)—to be implemented on Mobile Equipment (ME) such as a mobile or cellular telecommunications terminal. TPM, TCG and MTM are described in the documents available at this URL: https://www.trustedcomputinggroup.org/specs/mobilephone/—which documents are fully incorporated herein by reference.

As is known, the Mobile Phone Working Group's model allows for a software application running in a Secure Execution Environment (SEE) on a mobile device to emulate the effect of a TPM chip.

MTM is an open specification for common TCG security building block functions An ME typically would contain multiple MTMs, all of which provide similar functionality to TPMs and some of which have additional functionality to boot parts of an ME into a preset state. The MTM has much in common with the current TCG specification for Trusted Platform Modules (TPM) for personal computers. However, the MTM also provides functions which have been developed specifically for mobile devices—for example to take account of limitations of mobile device technologies. MTMs with just these adoptions are called Mobile Local-owner Trusted Modules (MLTMs), since they merely support usages similar to those of existing TPMs (controlled by an entity with physical access to the platform). Additional adaptions enable parts of mobile devices (not the entire device) to boot into preset states. These MTMs are called Mobile Remote-owner Trusted Modules (MRTMs), since they enable remote entities (such as the phone manufacturers and the cellular network provider) to preset the operation of some parts of the phone (such as access to the IMEI and the cellular network).

The MTM extends security and interoperates with existing mobile device components such as SIM, USIM, and UICC cards. In addition, MTM may support security for OMA, 3GPP, MIPI, OMTP, and others. MTM are intended to allow multiple trusted devices and components to work together and share the same security infrastructures.

MTM is designed to support a "multi-stakeholder" mobile device environment. A "stakeholder" can be considered to be an entity which is authorised to have a presence in the mobile device and which needs the ability to control and protect its individual interests in the mobile device. Mobile device stakeholders include the user/owner, the network service provider, the device manufacturer and potentially others, such as enterprises and third parties. MTM has been designed to enable a trusted and shared environment that is characteristic of mobile devices. A device manufacturer and network service provider would typically use a MRTM, while the user would typically use a MLTM.

The MTM, like the TPM, protects keys and other secrets while a platform is switched off and only enables keys (and secrets) to be used by the proper entity when the MTM is securely switched on. The MTM also has commands that enable selected stakeholder applications to boot in a safe environment in the mobile device, without interfering with the rights of other stakeholders.

A separate TPM/MTM chip for a mobile device has cost implications, but also serious management implications. For instance, it is hard to move the keys on the chip between devices, and moving the entire chip is prohibited by TCG Specifications. It is also difficult to update security parameters associated with the chip (for instance adding additional cryptographic algorithms, adding additional keys, or resetting a forgotten password used to control access to a key).

TCG Specifications support a Field Upgrade command. Upgrade procedures may require field service personnel to be physically present or have owner authorisation to perform upgrade procedures. This requires interaction with the TPM "Owner" role, and so is not appropriate for background updates (invisible to the local owner), or for a case of a remote "Owner" who owns millions of TPMs. It also does not solve the migration problem—where sensitive MTM data need to be transferred from one device to another.

Turning now to another area of background to the invention, digital TV service schemes have been rolled out in a number of different countries; these schemes are often incompatible with one another. The provision of mobile digital TV services is if anything more fragmented and has in many cases not been finalised: examples of competing standards include—DVB-H, T-DMB, DAB-IP, ISDB-T, TDtv or MediaFLO.

Even within a given standard there are barriers to usage in more than one territory. The rights of content owners are to some extent protected by requiring that the content in broadcast digital TV signals is encrypted using one of a number of service protection systems. Unfortunately, regulatory authorities in different territories have not settled upon a standard service protection system.

Mobile digital TV terminals may be dedicated TV devices or mobile communications handsets (i.e. mobile or "cell"-phones) or they may be personal video recorder devices, personal digital assistants or PCs with suitable tuner components.

The provision of competing broadcast standards and use of different, incompatible rights protection systems means that, even were the same standard (say, DVB-H) adopted in different territories, for a given terminal to be Mobile TV-enabled in more than one territory will often require that the terminal has to leave the factory with firmware supporting more than one service protection solution. Indeed terminals may be arranged to support all possible service protection methods but if all these methods are not used then the licensing and development costs involved in producing a terminal that supports these methods will have been wasted. A cheaper alternative, where support for all possible service protection methods is not possible or practical, is to replace the factory provided service protection profile by a whole new service protection profile that must be downloaded over the air (OTA). This is time consuming, at best: at worst, users can be dissuaded from using services entirely.

SUMMARY OF THE INVENTION

In one aspect, the present invention provides a terminal for use with a cellular or mobile telecommunications network, the terminal including a normal execution environment and a secure execution environment in which security functions trusted by a third party are performed, the mobile terminal including means for enabling amendment of the software of the terminal for performing the security functions in the secure execution environment.

In a first embodiment of the invention to be described below the security functions may be security functions in accordance with the Mobile Trusted Module (MTM) Standards. In a second embodiment the security functions are for performing Digital Rights Management (DRM) in for mobile television.

A full MTM is fairly complicated, as it consists of a number of different commands (called "ordinals"). The terminal may be provided with minimal software initially, with the terminal being operable to update the software by subsequent over the air transmission of software. For example a subset of MTM functions may initially be provided, and further MTM functions may subsequently be added.

The terminal may include means for determining when the required software component is absent from the terminal, and means for obtaining the software component from a predetermined application server. In the embodiment the software component is loaded into the secure execution environment of the terminal.

Conveniently, the amendment of the software of the terminal in the secure execution environment may be performed in the background without requiring intervention of the user of the terminal, or of the user of the terminal being aware that such amendment is occurring.

Conventionally, MTMs could create some real management problems if a user forgets critical authorisation data used to access keys (PINs, passwords etc.). As this is very likely in practice, a recovery mechanism is desirable (e.g. remotely reset the password), but currently TCG does not define any way to do this safely. However, the upgradeable software MTM of the embodiment could have such mechanisms. The terminal may include means for receiving authorisation data, such as new keys, in the secure execution environment. These keys may be provided by an authorisation server coupled to the telecommunications network.

The terminal may further include means for deleting or otherwise disabling the software or keys of the terminal in the secure execution environment.

Conventionally, MTMs could also create real management problems if a user needs to transfer sensitive data like keys (or encrypted files) from one terminal to another. In practice, users will want to do this transfer. While there are known mechanisms in TCG to migrate keys, none are "transparent"—i.e. they cannot just run as a background (over the air) OTA process without bothering the user. Also, conventionally, there are real problems making sure that the keys are thoroughly deleted from the TPM or MTM where they originated. Current TCG technology cannot guarantee this, so in practice it has to be accepted that there might be two copies of the migrated key. An upgradeable software MTM may provide mechanisms both to migrate sensitive data transparently to a new terminal, and in accordance with the embodiment to securely erase from the original terminal.

TPMs are required to have certain security properties. In particular the designer of the TPM will produce a description of these properties known as a "security target". The designer claims that his TPM meets this "security target" and also that the target is consistent with a "protection profile" (which TCG have defined). A similar process is being defined for MTMs. When applying an upgrade, the designer has to make sure that:
 a) Either the upgraded MTM meets the same security target as the original MTM or
 b) The upgraded MTM meets a modified security target, but this modified target is still consistent with the TCG protection profile.

That means that any keys, authorisation/security data etc. which were considered "safe" prior to upgrade are still considered "safe" after upgrade.

Achieving this property of "security maintained under upgrade" is difficult, and in practice it limits TPM chips to rather minor upgrades. However, in accordance with the embodiment, if the upgrades/migrations to a MTM are done entirely within a Secure Execution Environment (and the SEE and the processes for managing the SEE also form part of the security target), the required security properties can be preserved.

The present invention also relates to a method of providing security functions trusted by a third party in a terminal for use with a cellular or mobile telecommunications network, as defined in the claims.

In accordance with a further aspect of the present invention, there is provided a method for processing encrypted data received by a terminal, comprising: providing a security platform having a normal execution environment and a secure execution environment; obtaining key information necessary for facilitating decryption of the encrypted data; in the secure execution environment, processing the key information in accordance with a given secure protocol to extract temporary decryption information; and in the normal execution environment, using the temporary decryption information to decrypt the encrypted data, wherein the given secure protocol is represented by at least one secure application component that is adapted to execute only in the secure execution environment.

Advantageously, the terminal is portable.

The encrypted data traffic may be encrypted in accordance with one of a plurality of secure protocols, each having a corresponding secure application component, the method further comprising determining which of the plurality of secure protocols has been used in encrypting the data traffic; and loading the or each corresponding secure application component.

Whenever a corresponding secure application component is not available within the terminal, the method may further comprise: requesting a copy of the corresponding secure application component from a pre-determined application server; downloading the component; installing the component on the terminal; and loading the component into the secure execution area.

Preferably, the method further comprises, determining whether the at least one secure application component requires replacement; requesting a replacement secure application component from a pre-determined application server; downloading the replacement component; installing the replacement component on the terminal; and loading the replacement component into the secure execution area in place of the at least one secure application component.

The key information necessary for facilitating decryption is preferably securely stored in the terminal.

Alternatively, the key information necessary for facilitating decryption may be obtained from a broadcast key information message.

Access to the key information may be provided by a smartcard inserted in the terminal. In this case, the service keys may be securely stored in the smartcard.

Conveniently, the key information includes rights objects and/or key stream messages that incorporate service keys. The service keys are preferably securely stored in the secure area.

The encrypted data received by the terminal may be downloaded encrypted content, the key information being a rights object corresponding to the content and the temporary decryption information being a decryption key for decrypting the downloaded encrypted content.

Preferably, the encrypted data received by the terminal is broadcast data traffic, so that the method decrypts the encrypted data traffic in real time.

The solution is thus to implement the terminal elements on a platform supporting a secure execution environment (SEE), into which small, very secure applications can be downloaded, in addition to the normal execution environment, i.e. the main terminal OS. Elements of the methods that are common to all methods are implemented in the main OS whereas the elements in which they differ are implemented in the SEE.

In arriving at the solution, it was realised that the difference between service protection methods lies mainly in how the service key is delivered and the provisioning of the primary/user key. Furthermore, service key delivery and use (to decrypt messages containing traffic keys) and primary key use/provisioning are the most sensitive parts and most likely to be run in a secure execution environment.

As a result of its operation, the method provides a system for facilitating OTA download of key management service elements, or "profiles", (which are relatively small by comparison to the OTA download of whole services). The inventive method also provides an efficient architecture for factory support of more than one profile.

As a consequence of adopting this architecture, a requirement for a terminal to support a protection method which it does not already support is addressed by arranging for the SEE elements (the "profile") of the new method to be downloaded to the terminal's SEE, and the whole method thereby supported without the need for the (bandwidth hungry, time consuming) download of a whole application.

The solution can thus also be used to renew or upgrade the SEE element for one protection method whilst staying with the same protection method. Examples of situations where this might be desirable include: when the SEE element has a bug or a weakness in it and/or when there is an upgrade giving additional functionality to the SEE element.

Where a network operator requires that terminals support the solution, the terminals can, in principle, be used for any of the possible protection methods, via download. The solution can furthermore be used across whole networks to repair and renew terminals where the SEE element is buggy or hacked, and can be used to upgrade terminals so allowing new functionality to be implemented on existing terminals instead of having to wait for new terminals to be released by manufacturers.

In accordance with another aspect of the present invention, there is provided a system for processing encrypted data received by a terminal incorporating a security platform with a normal execution environment and a secure execution environment, the system comprising: means for obtaining key information necessary for facilitating decryption of the encrypted data; means for processing the key information in accordance with a given secure protocol to extract temporary decryption information in the secure execution environment; and further processing means for using the temporary decryption information to decrypt the encrypted data in the normal execution environment, wherein the given secure protocol is represented by at least one secure application component that is adapted to execute only in the secure execution environment.

The secure execution environment may be adapted to host a plurality of secure protocol instruction files, each corresponding to a distinct secure protocol.

In accordance with yet another aspect of the present invention, there is provided a user terminal that incorporates the system as set out above.

BRIEF DESCRIPTION OF THE DRAWINGS

For a better understanding of the present invention, embodiments will now be described, by way of example only, with reference to the accompanying drawings, in which.

DETAILED DESCRIPTION OF EMBODIMENTS OF THE INVENTION

The elements of a conventional mobile or cellular telecommunications network will first be briefly described with reference to FIG. 1.

Figure 1:
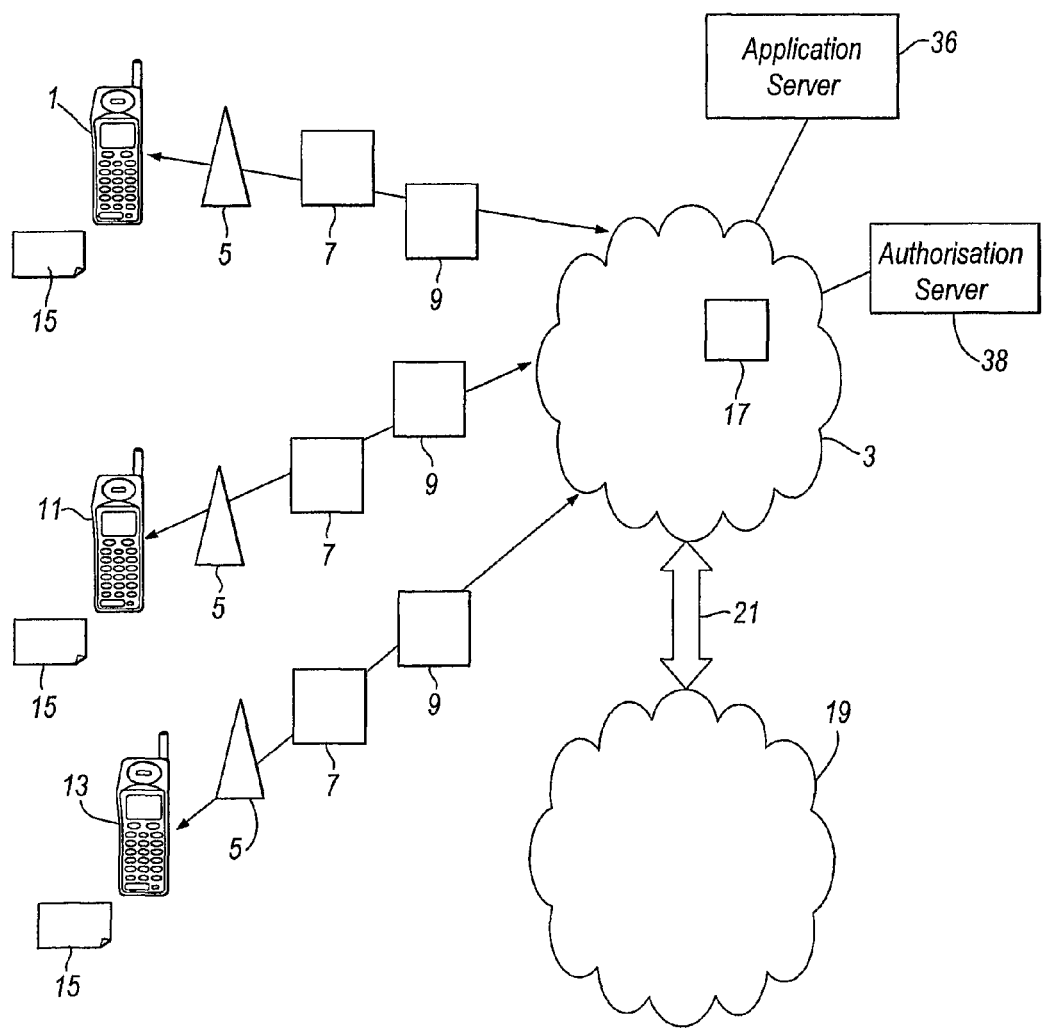
FIG. 1 shows schematically the elements of a telecommunications network including mobile telecommunication terminals.

FIG. 1 shows schematically a network in which the invention may be used. The figure shows a cellular network. However, it should be appreciated that the invention is applicable to any type of network, although it is particularly applicable to a network where at least some of the devices communicate using mobile telecommunications/wireless data transmission.

A first telecommunications terminal 1 is registered with a GSM/GPRS or UMTS (3G) mobile telecommunications network 3. The telecommunications terminal 1 may be a handheld mobile telephone, a personal digital assistant (PDA) or a laptop computer equipped with a datacard. The telecommunications terminal 1 communicates wirelessly with mobile telecommunications network 3 via the radio access network (RAN) of the mobile telecommunications network 3, comprising, in the case of a UMTS network, a base station (Node B) 5, and a radio network controller (RNC) 7. Communications between the telecommunications terminal 1 and the mobile telecommunications network 3 are routed from the radio access network via GPRS support nodes (SGSN) 9, which may be connected by a fixed (cable) link to the mobile telecommunications network 3.

In a conventional manner, a multiplicity of other telecommunications terminals are registered with the mobile telecommunications network 3. These telecommunications terminals include second and third telecommunications terminals 11, 13. The second and third telecommunications terminals 11, 13 communicate with the mobile telecommunications network 3 in a similar manner to the telecommunications terminal 1, that is via an appropriate Node B 5, RNC 7 and SGSN 9.

The mobile telecommunications network 3 includes a gateway GPRS support node (GGSN) 17 which enables IP-based communications with other networks, such as the Internet or other IP network 19 via an appropriate link 21.

Each of the telecommunications terminals 1, 11 and 13 is provided with a respective subscriber identity module (SIM) 15. During the manufacturing process of each SIM, authentication information is stored on the SIM under the control of the mobile telecommunications network 3. The mobile telecommunications network 3 itself stores details of each of the SIMs issued under its control. In operation of the mobile telecommunications network 3, each of the telecommunications terminals 1, 11, 13 is authenticated (for example, when the user activates the telecommunications terminal in the network with a view to making or receiving calls) by the network sending a challenge to the telecommunications terminal 1,11,13 incorporating a SIM 15, in response to which the SIM 15 calculates a reply (dependent on the predetermined information held on the SIM—typically an authentication algorithm and a unique key Ki) and transmits it back to the mobile telecommunications network 3. The mobile telecommunications network 3 includes an authentication processor 17 which generates the challenge and which receives the reply from the telecommunications terminal 1, 11, 13. Using pre-stored information identifying the relevant SIM 15, the authentication processor calculates the expected value of the reply from the telecommunications terminal 1, 11, 13. If the reply received matches the expected calculated reply, the SIM 15 and the associated telecommunications terminal are considered to be authenticated.

It should be understood that such an authentication process can be performed for any telecommunications terminal provided with a SIM 15 under control of the mobile telecommunications network 3. In the embodiment each telecommunications terminal 1,11,13 communicates wirelessly with the mobile telecommunications network 3 via the network's radio access network, although this is not essential. For example, the telecommunications terminal may communicate with the network via the fixed telephone network (PSTN), via a UMA "access point" and/or via the Internet.

The SIM 15 used by each telecommunications terminal 1,11,13 may be a SIM of the type defined in the GSM or UMTS standards specifications, or may be a simulation of a SIM—that is, software or hardware that performs a function corresponding to that of the SIM. The SIM may be in accordance with the arrangement described in WO-A-2004 036513.

Figure 2:
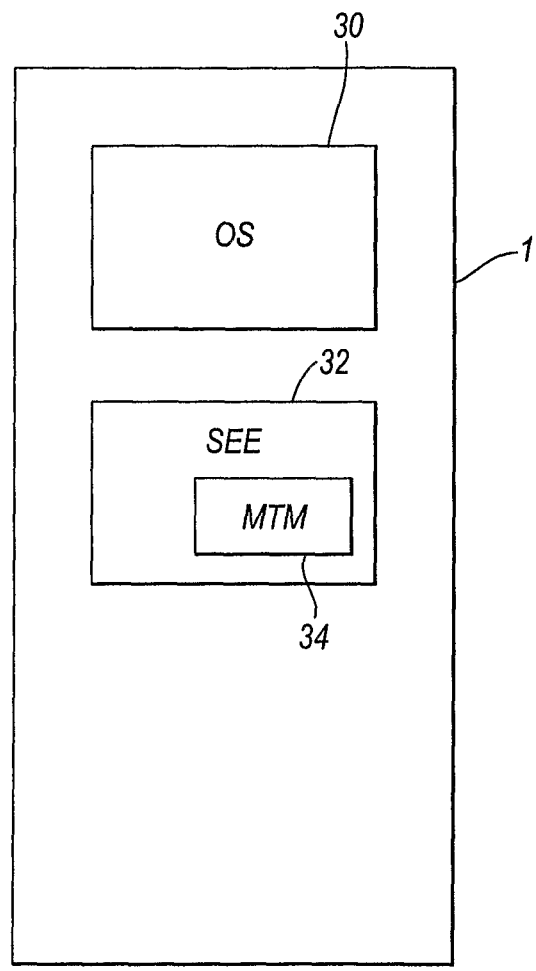
FIG. 2 shows schematically some elements present in one of the telecommunications terminals of FIG. 1.

As shown in FIG. 2, the mobile terminal 1 includes a main operating system (OS) 30, similar to that found on a conventional mobile terminal. The operating system 30 can be considered to be a "normal execution environment". The mobile terminal 1 further includes a secure execution environment (SEE) 32 in which a mobile trusted module (MTM) 34 is implemented. In the SEE 32 very secure applications can be stored and typically comprise less than 10K of data.

The MTM 34 may include the elements and operate in the manner described in the TPM, TCG and MTM Standards described above. Advantageously, the MTM 34 is provided with only minimum functionality (for example, basic software) at the time the mobile terminal 1 is manufactured or initially programmed. The MTM 34 may at this stage include a limited number of keys or other authorisation data. This has the advantage of avoiding wasting storage in the secure execution environment 32 at the time of manufacture of the mobile terminal 1. Such a procedure can be wasteful in the event that some MTM functionality is not ever required by the mobile terminal 1.

The network 3 is operable to communicate with a predetermined application server 36 for providing software updates to the MTM 34 of the mobile terminal 1. The mobile terminal 3 also communicates with an authorisation server 38 for providing authorisation data, such as keys, to the MTM 34 of the mobile terminal 1.

In the embodiment, the Secure Execution Environment 32 also has sufficient additional space and functions to process upgrades to the software MTM 34. The terminal 1 supports a method to:
  a) Download from the application server 36 (or otherwise acquire) upgrades to a software MTM 34, either with explicit user interaction, or on certain user-triggered events, or as a background event (where data is downloaded invisibly to the user)
  b) Transfer an upgrade to the software MTM 34 into the secure execution environment 32. This may be done via explicit call of the Field Upgrade command (which requires user/"Owner" interaction), or as a secure background process invisible to MTM commands and function calls.
  c) Allow sensitive data—such as new keys, or new key authorisation data from the authorisation server 38—to be encrypted within, or with, the upgrade and then to be decrypted and used solely within the secure execution environment 32 as part of the software MTM 34.
  d) Allow sensitive data—such as old keys, or old key authorisation data—to be deleted from the secure execution environment 32, so it is no longer part of the software MTM. These keys can be transferred from one MTM enabled device to another.

The software MTM could be provided with new management credentials in the field (an EK, SRK and AIK(s)), thus avoiding the cost of creating all these credentials at device manufacture. Keys that the network 3, or a user, has stored in a MTM for one device may be transparently moved to another device. Authorization data that has been forgotten by the user (PIN or password) could be remotely reset.

In the second embodiment now to be described, when considering the various service purchase & protection (SPP) methods, those component elements of the SPP methods that are common to all methods are implemented in the main OS whereas the elements in which they differ are implemented in the SEE.

As noted earlier, the difference between service protection methods lies mainly in how the service key is delivered and the provisioning of the primary/user key. Furthermore, service key delivery and use (to decrypt messages containing traffic keys) and primary key use/provisioning are the most sensitive parts and most likely to be run in a secure execution environment. The SEE elements include key management elements referred to as "profiles".

The differences between SPP methods may be appreciated from consideration of the main methods proposed for use with the DVB-H standard.

For the DVB-H standard, the Convergence of Broadcast and Mobile Services (DVB-CBMS) working group have advanced two main approaches to SPP: Internet Protocol Datacast (IPDC) SPP Open Security Framework (OSF) and another SPP system referred to as 18Crypt.

The BCAST group of the Open Mobile Alliance (OMA) has taken a slightly different approach: OMA BCAST has specified a SPP standard that is suitable for use not just with DVB-H but with other bearer standards including T-DMB. Within the OMA BCAST specifications there is a DRM profile (BCAST/DRM) and a Smartcard profile, which uses the Universal Integrated Circuit Card (UICC) in a mobile terminal to store and process primary/user keys and service keys. In many implementations of the latter profile, a Subscriber Identification Module (SIM) takes the role of the UICC.

Figure 3:
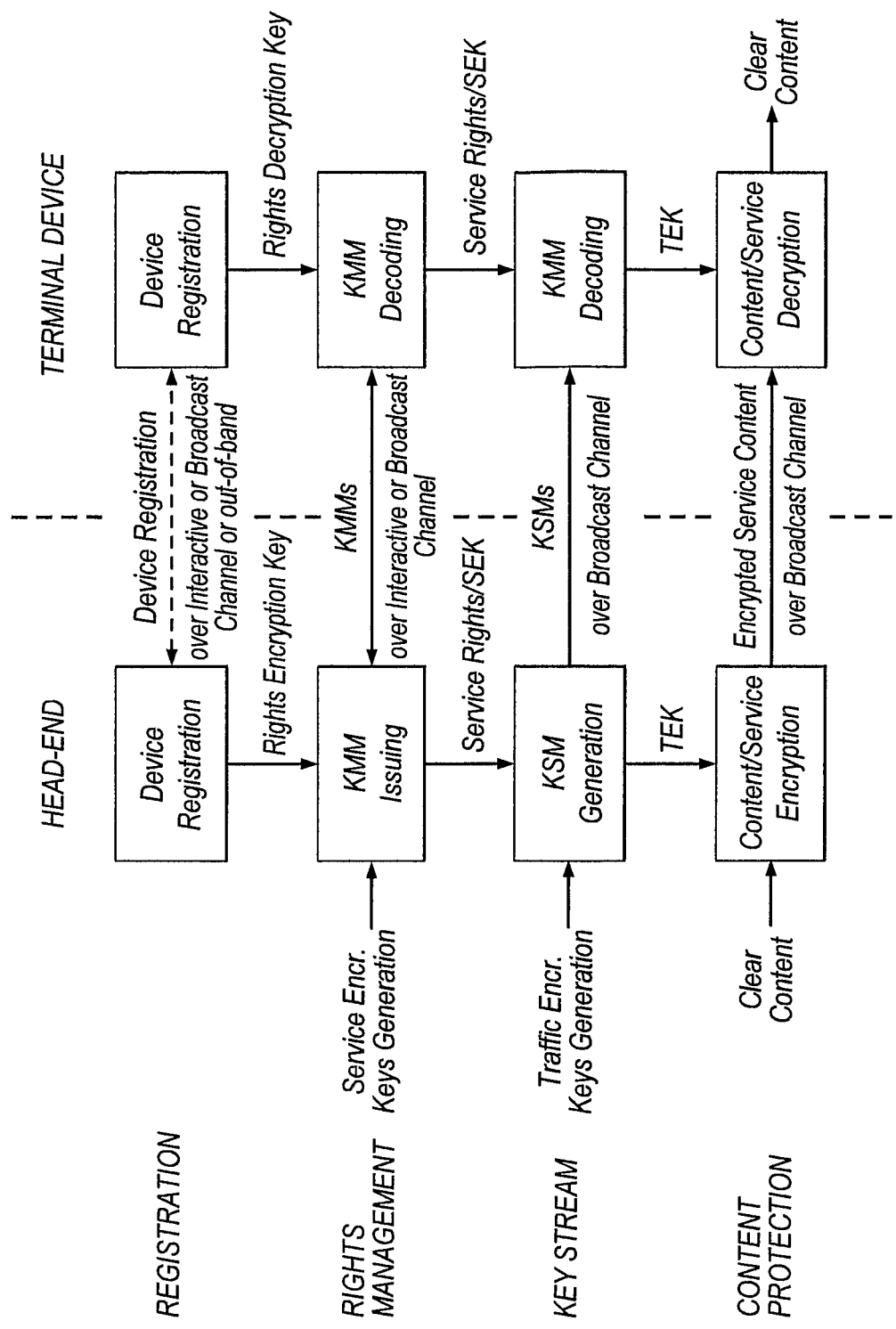
FIG. 3 shows the four layer hierarchical structure adopted in the known approaches to service purchase and protection for the DVB-H standard.

All four approaches (OSF, 18Crypt, BCAST/DRM and BCAST/Smartcard) share many features in their management of keys. Indeed, OMA BCAST/DRM scheme follows the same handling registration and rights management stages as 18Crypt. All approaches conform to a four layer hierarchical structure (see FIG. 3), comprising: a content/service protection layer in which contents/services are encrypted by a symmetric encryption algorithm using a Traffic Encryption Key (TEK); a key stream layer (KSL) which implements the delivery of Traffic Encryption Keys (TEKs) by transmission of Key Stream Messages (KSMs) to the terminal on the broadcast channel; a rights management layer (RML) in which content/service access rights are delivered to devices using key management messages (KMMs); and a registration layer in which key material and metadata are exchanged to enable devices to decrypt and authenticate rights and, ultimately, to access content and/or services.

The approaches all allow for delivery of content either through a broadcast network (where digital transmission supports only unidirectional communication from the broadcaster to the device) or an interactivity channel, (where a bi-directional channel is established between the service network and the device to facilitate reliable exchange of messages).

Encryption in the content/service protection layer of this hierarchy can be performed at the network layer (IPsec), session layer (SRTP), or content layer (ISMACryp). TEKs change frequently to prevent real-time key distribution attacks.

The content/service access rights can consist of Service Encryption Keys (SEK) and/or Program Encryption Keys (PEK), used to access the Key Stream Messages (KSMs), and/or information such as entitlements. In the literature, these keys are also referred to as service keys (SK) and program keys (PK), respectively—the terms are interchangeable with the SEKs and PEKs.

The KSMs, in essence, contain information that allows the terminal to reconstruct the TEKs needed to decrypt the content/service. KSMs may contain additional information to control access to the content service, such as access criteria.

KMMs are typically exchanged as a result of a purchase transaction and transferred to terminals via the interactive or broadcast channel.

The IPDC SPP Open Security Framework (OSF) specification defines a content/service protection layer that allows freedom of choice of Key Management System (KMS).

In the KSL of the OSF specification, the KSMs are referred to as Entitlement Control Messages (ECMs). The OSF defines the ECM stream signalling and leaves the format and content of the ECM to be private to the KMS, again facilitating the use of proprietary KMSs.

In the OSF specification of the rights management layer, KMMs are referred to as Entitlement Management Messages (EMMs). The OSF defines a protocol for EMM stream signalling and again leaves the format and content of the EMM to be private to the KMS. As both the ECM and EMM systems are left private, it is possible to deploy a KMS that defines both the Key Stream and Rights Management layers.

The OSF registration layer is also defined as private to the KMS.

Broadly speaking, the OSF is specified to be capable of supporting any number of security providers' technologies so as to allow seamless replacement (e.g. by software download) of one security provider's proprietary KMS with another.

In the 18Crypt approach, the open standard OMA DRM 2.0 is used as the default framework for rights management. This DRM standard manages the rights to use files stored in a device. The 18Crypt approach extends OMA DRM 2.0 to the case of receiving streaming content over the broadcast channel and provides a means of performing rights management over a broadcast channel.

In 18Crypt, data is encrypted using symmetric encryption: for instance, by using IPSec, SRTP or ISMACryp. The content/service protection layer of the 18Crypt scheme is referred to as the "traffic layer", the key to the symmetric encryption function being the TEK. This TEK is changed periodically at a frequency in the order minutes, if not seconds.

Naturally, any receiving device needs some means for obtaining the TEKs as they change. 18Crypt provides for the TEKs themselves to be transmitted on a dedicated KSL. Each TEK is encrypted using either a PEK or a SEK and broadcast on the KSL within a KSM.

The SEK is only transmitted to a device as part of a rights object (RO). Transmission of rights objects takes place, conceptually, on the rights management layer. Access to a service or program is thus governed by the existence of the appropriate SEK in the ROs held by the device.

The registration layer for 18Crypt allows for the exchange of key material and metadata necessary for decryption and ultimate presentation of data both broadcast and out of band, as well as data associated with interactivity channels. The SEKs are extracted from the ROs and stored in a secure area of the firmware (as opposed to the UICC in BCAST).

In the 18Crypt specification, KMMs are delivered via the broadcast channel (or the interactivity channel) and can carry Rights Objects (ROs) containing rights on the service or programme levels. 18Crypt specifies the RML and Rights Issuer Services (RIS).

The 18Crypt specification adopts OMA DRM 2.0 for its rights management while BCAST/Smartcard is also based upon OMA DRM 2.0: where these two specifications differ, lies predominantly in the registration layer. More generally, methods for protecting mobile broadcast streams are typically the same with regard to methods for encryption of the broadcasted content itself and differ with respect to protection and delivery of the keys used to encrypt the content (these keys must be securely distributed to users so that they can decrypt the broadcast content).

The following discussion explains in more detail how the SEE elements of each SPP method interact with the common OS elements of the method in the context of the DVB-H standard.

Code for the SPP platform is arranged to provide functionality in both a normal execution environment and a secure execution environment (SEE). For each SPP key management profile, there is a corresponding Secure SPP profile application component (e.g. a "stiplet" in STIP). These secure application components interface with the NEE through a common interface protocol, effectively making the SEE functionality a "black-box" from the normal execution environment. The normal execution SPP code provides a platform that allows the manipulation of content within the normal execution environment and where interaction with a particular SPP profile is needed, through the use of calls to the corresponding "black-box" secure SPP code.

The application components of the different SPP methods that are common to all profiles are thus implemented in generic code suitable for operation in the main OS. Code for providing SEE functionality need only be arranged to reflect distinctions between profiles, the download size for each new secure application component can be significantly reduced. This is particularly advantageous where, as in the field of mobile devices, memory space is necessarily limited.

Figure 4:
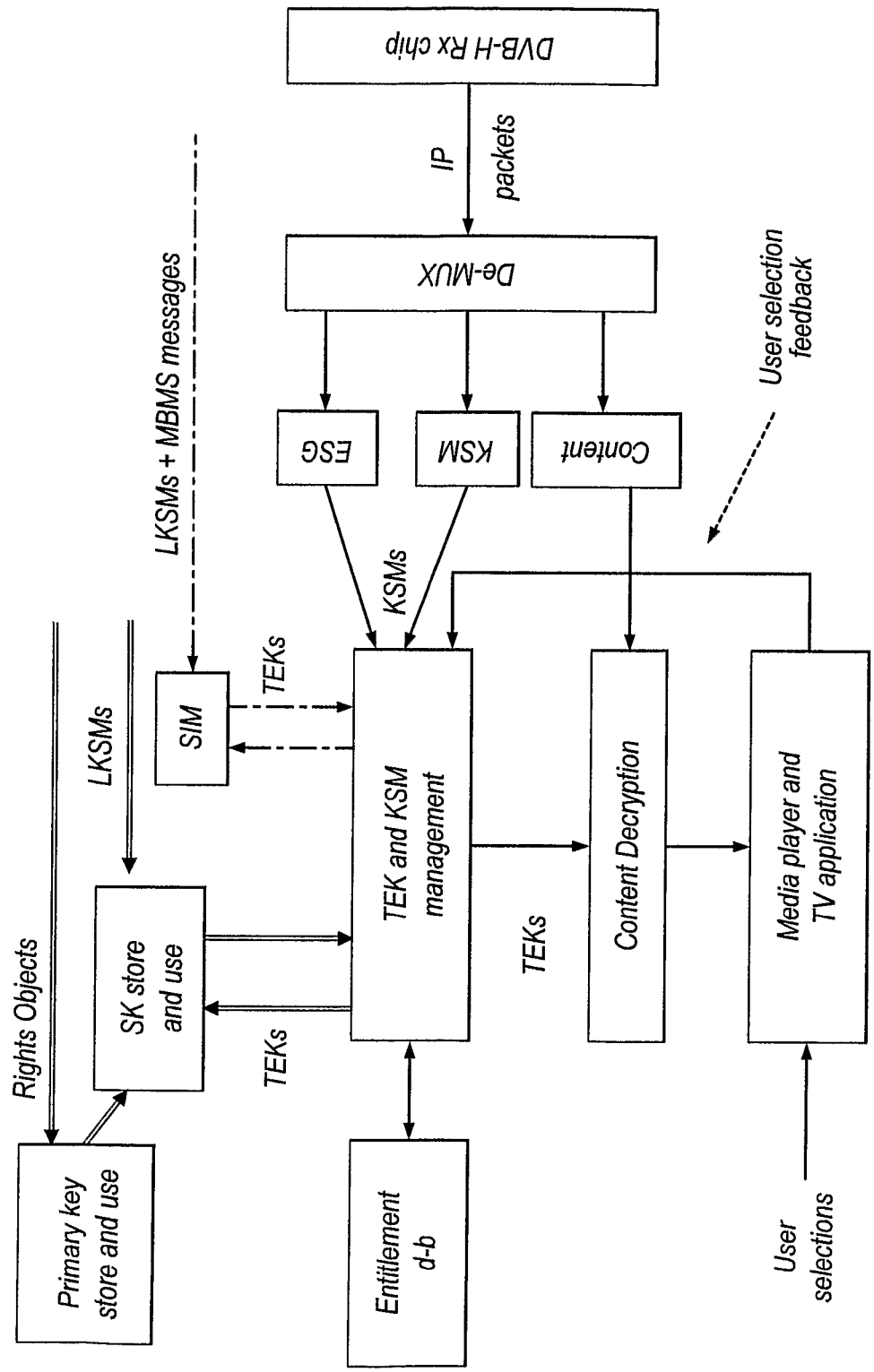
FIG. 4 shows the functional blocks in the key provisioning architecture of DVB-H CBMS OSF, DVB-H CBMS 18Crypt, OMA BCAST Smartcard and OMA BCAST DRM.

In FIG. 4, the functional blocks of a key provisioning architecture for DVB-H are set out diagrammatically. This architecture is equally applicable to DVB-H CBMS OSF, DVB-H CBMS 18Crypt, OMA BCAST Smartcard and OMA BCAST DRM.

Figure 5:
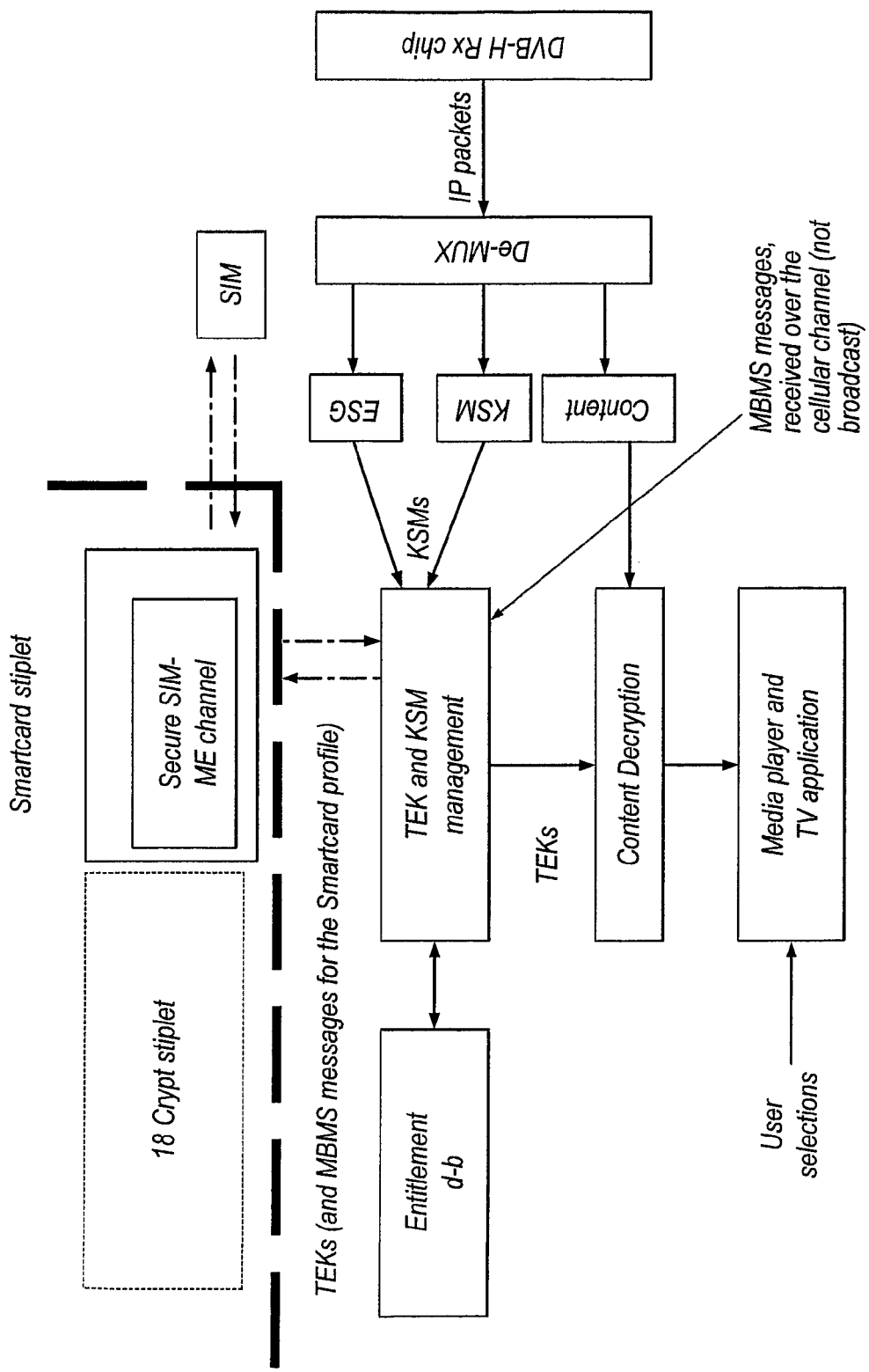
FIG. 5 shows an implementation of the key provisioning architecture of OMA BCAST Smartcard emphasising the operation in a secure processing area of a smartcard profile.

The distinct operation of the OMA BCAST implementation of the key provisioning architecture is shown in FIG. 5. The Figure emphasises operation in a secure processing area of a smartcard profile.

Figure 6:
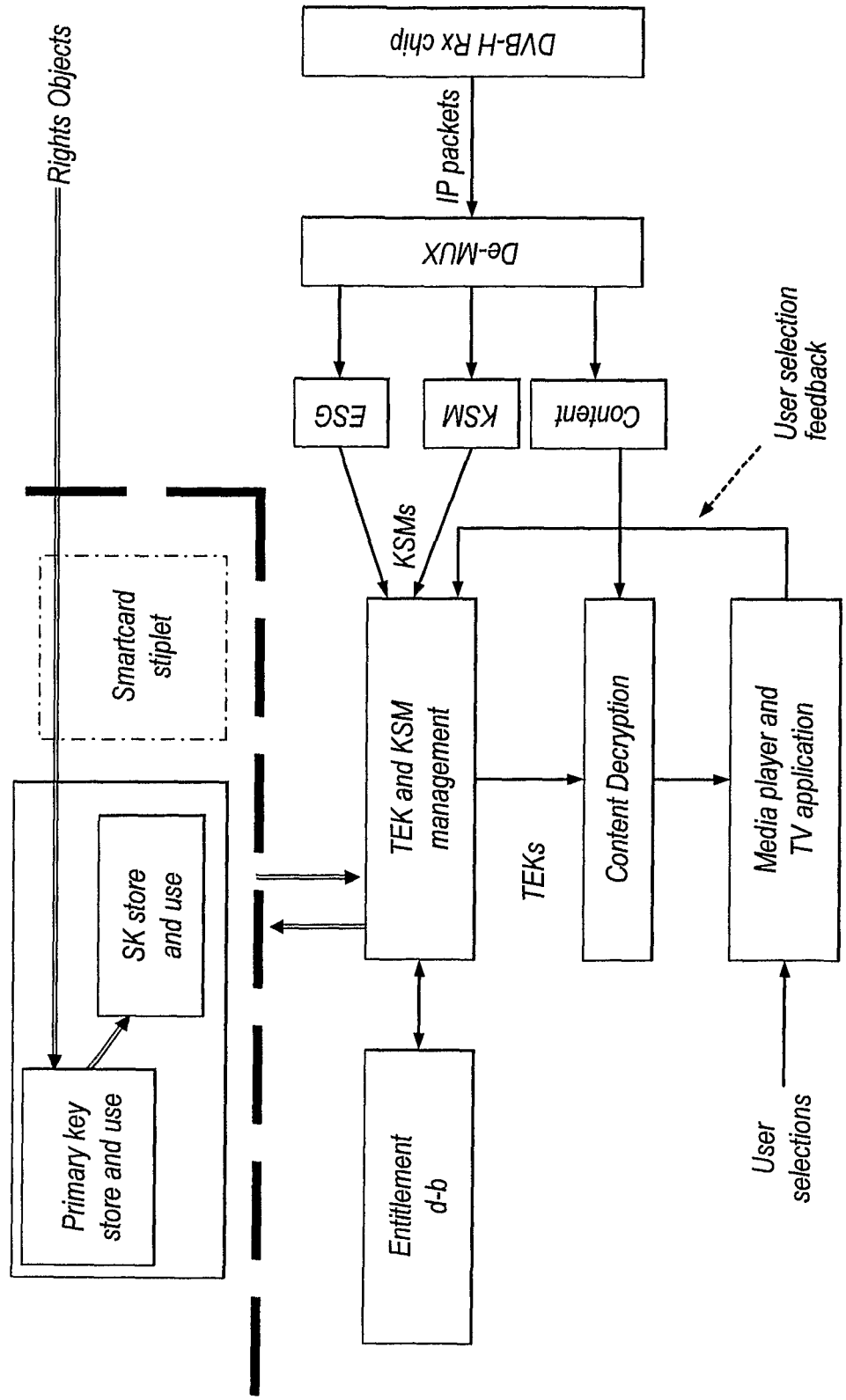
FIG. 6 shows an implementation of the key provisioning architecture of DVB-H CBMS 18Crypt emphasising the operation in a secure processing area of the 18Crypt key management decryption profile.

By way of contrast, FIG. 6 shows an implementation of the key provisioning architecture of 18Crypt emphasising the operation in a secure processing area of the 18Crypt key management decryption profile.

Another reason such a solution might be seen as particularly attractive to the mobile TV environment is the comparative difficulty of software obfuscation in the limited memory available to mobile applications. Software obfuscation has served the fixed PC world well as an alternative to protection using hardware-based encryption—in the mobile world the limited memory and processing power means that this technique is less effective and less appropriate.

In the foregoing discussion, Mobile TV is described in terms of the DVB-H architecture. The invention in not intended to be limited to this technology; indeed it is equally applicable to any system for managing rights over broadcast data, including T-DMB, DAB-IP and TDtv.

The second embodiment of the invention as described above relates to DRM and broadcast service protection. The invention can also be applied to multicast and/or unicast (downloaded) data in much the same way as to broadcast data traffic. Furthermore, as the skilled person will appreciate, the same principles will apply in related technological fields: for example e-commerce applications; Corporate data security applications; SIMLock applications (by which is meant, applications that facilitate the software locking of some or all of the functionality of smart cards such as SIMs); applications to effect secure boot of terminals but in a flexible manner that can be changed OTA; and applications that provide a secure UI.

The invention claimed is:

1. A terminal for use with a cellular or mobile telecommunications network, the terminal including:
   a security platform including:
      a normal execution environment; and
      a secure execution environment in which security functions trusted by a third party are performed;
   wherein the security platform is configured to amend software of the terminal for performing the security functions entirely in the secure execution environment, wherein the amendment of the software is performed entirely within the secure execution environment such that a required security property of the amended software is consistent with a protection profile associated with the software before and after the amendment, wherein new keys associated with the software for performing the security functions are encrypted within the amended software and decrypted and used solely within the secure execution environment.

2. The terminal of claim 1, provided with minimal software initially, the terminal being operable to update the software by subsequent over the air transmission of software.

3. The terminal of claim 1, wherein the terminal is configured to determine when a required software component is absent from the terminal, and to obtain the software component from a predetermined application server.

4. The terminal of claim 3, wherein the software component is loaded into the secure execution environment.

5. The terminal of claim 1, wherein the amendment of the software of the terminal in the secure execution environment is performed in the background without requiring intervention of a user of the terminal.

6. The mobile terminal of claim 1, wherein the terminal is configure to receive authorization data, including the new keys, for use in the secure execution environment.

7. The terminal of claim 1, wherein the terminal is configured to delete or disable the software of the terminal in the secure execution environment.

8. The terminal of claim 1, wherein the security functions relate to a storage of sensitive data together with a record of a state of the terminal.

9. The terminal of claim 1, wherein the security functions implement a Mobile Trusted Module, MTM, or a Trusted Platform Module, TPM.

10. The terminal of claim 9, wherein the security functions implement a subset of MTM or TPM functions initially, and perform a greater subset of MTM or TPM functions, or full MTM or TPM functions, after said amendment of the software.

11. The terminal of claim 1, wherein the terminal is configured to transfer software or authorization data, including the keys, to another terminal without requiring intervention of the user of at least one of the terminals.

12. A method of providing security functions trusted by a third party in a mobile terminal for use with a cellular or mobile telecommunications network, the terminal including a normal execution environment and a secure execution environment in which the security functions trusted by the third party are performed, the method including:

amending software of the terminal for performing the security functions entirely in the secure execution environment, wherein the amendment of the software is performed entirely within the secure execution environment such that a required security property of the amended software is consistent with a protection profile associated with the software before and after the amendment;

encrypting new keys associated with the amended software wherein the new keys are decrypted and used solely within the secure execution environment.

13. The method of claim 12, wherein the software of the terminal for performing the security functions has only minimal functionality initially, the method including subsequently updating the software by over the air transmission of software.

14. The method of claim 12, further including:

determining when a required software component is absent from the terminal, and obtaining the required software component from a predetermined application server.

15. The method of claim 14, including loading the required software component into the secure execution environment.

16. The method of claim 12, further including amending the software of the terminal in the secure execution environment in the background without requiring the intervention of the user of the terminal.

17. The method of claim 12, further including receiving authorization data, including the new keys, for use in the secure execution environment.

18. The method of claim 12, further including deleting or disabling the software of the terminal in the secure execution environment.

19. The method of claim 12, wherein the security functions relate to storage of sensitive data together with a record of a state of the terminal.

20. The method of claim 12, wherein the security functions implement a Mobile Trusted Module, MTM, or a Trusted Platform Module, TPM.

21. The method of claim 20, wherein the security functions implement a subset of MTM or TPM functions initially, and perform a greater subset of MTM or TPM functions, or full MTM or TPM functions, after said amendment of the software.

22. The method of claim 12, further including transferring software or authorization data, including the keys, to another terminal without requiring intervention of the user of at least one of the terminals.

23. A method for processing encrypted data received by a terminal, comprising:

providing a security platform having a normal execution environment and a secure execution environment, the secure execution environment being loaded with at least one secure application component adapted to execute only in the secure execution environment, the at least one secure application component representing a secure protocol;

obtaining a key management profile necessary for facilitating decryption of the encrypted data;

in the secure execution environment, using the at least one secure application component to process the key management profile with the given secure protocol in order to extract temporary decryption information, wherein amendment of the at least one secure application component is performed entirely within the secure execution environment such that a required security property of the amended at least one secure application component is consistent with a protection profile associated with the at least one secure application component before and after the amendment; and in the normal execution environment, using the temporary decryption information to decrypt the encrypted data traffic.

24. A method for processing encrypted data received by a terminal as claimed in claim 23, wherein the terminal is portable.

25. A method as claimed in claim 23, wherein the encrypted data traffic is encrypted in accordance with one of a plurality of secure protocols, each having a corresponding secure application component, the method further comprising determining which of the plurality of secure protocols has been used in encrypting the data traffic; and loading the or each corresponding secure application component.

26. A method as claimed in claim 25, further comprising:
whenever a corresponding secure application component is not available within the terminal, requesting a copy of the corresponding secure application component from a pre-determined application server downloading the component, installing the component on the terminal; and
loading the component into the secure execution area.

27. A method as claimed in claim 23 further comprising:
determining whether the at least one secure application component requires replacement;
requesting a replacement secure application component from a predetermined application server;
downloading the replacement component;
installing the replacement component on the terminal; and
loading the replacement component into the secure execution area in place of the at least one secure application component.

28. A method as claimed in claim 23, wherein the key information necessary for facilitating decryption is securely stored in the terminal.

29. A method as claimed in claim 23, wherein the key management profile necessary for facilitating decryption is obtained from a broadcast key information message.

30. A method as claimed in claim 23, wherein access to the key management profile is provided by a smartcard inserted in the terminal.

31. A method as claimed in claim 30, wherein the key management profile is securely stored on the smartcard.

32. A method as claimed in claim 23, wherein the key management profile includes rights objects and/or key stream messages that incorporate service keys.

33. A method as claimed in claim 32, wherein the service keys are securely stored in the secure area.

34. A method as claimed in claim 23, wherein the encrypted data received by the terminal is downloaded encrypted content, the key management profile being a rights object corresponding to the content and the temporary decryption information being a decryption key for decrypting the downloaded encrypted content.

35. A method as claimed in claim 23, wherein the encrypted data received by the terminal is broadcast data traffic, so that the method decrypts the encrypted data traffic in real time.

36. A system for processing encrypted data received by a terminal incorporating a security platform with a normal execution environment and a secure execution environment, the secure execution environment being loaded with at least one secure application component adapted to execute only in the secure execution environment, the at least one secure application component representing a secure protocol, the system comprising:
the security platform configured to:
obtain a key management profile necessary for facilitating decryption of the encrypted data traffic;
use, in the secure execution environment, the at least one secure application component to process the key management profile in accordance with the given secure protocol to extract temporary decryption information in the secure execution environment, wherein amendment of the at least one secure application component is performed entirely within the secure execution environment such that a required security property of the amended at least one secure application component is consistent with a protection profile associated with the at least one secure application component before and after the amendment; and
decrypt the encrypted data traffic in the normal execution environment using the temporary decryption information.

37. A system as claimed in claim 36, wherein the secure execution environment is adapted to host a plurality of secure protocol instruction files, each corresponding to a distinct secure protocol.

38. A system as claimed in claim 36, wherein the terminal is portable.

39. A system as claimed in claim 36, wherein the encrypted data traffic is encrypted in accordance with one of a plurality of secure protocols, each having a corresponding secure application component, the system further:
the security platform determining which of the plurality of secure protocols has been used in encrypting the data traffic; and
an application loader for loading the or each corresponding secure application component.

40. A system as claimed in claim 39, further comprising:
the security platform determining whether a corresponding secure application component is available within the terminal;
a server interface, which requests a copy of the corresponding secure application component from an application server when the security platform the corresponding secure application component is not available; and
a downloader for downloading the component and installing the component on the terminal;
wherein the application loader further operates to load the newly installed component into the secure execution area.

41. A system as claimed in claim 39, further comprising:
the security platform determining whether the at least one secure application component requires replacement;
the security platform requesting a replacement secure application component from a replacement application server when the update checking means determines that the corresponding secure application component requires replacement; and
a replacement downloader for downloading the replacement component and installing the replacement component on the terminal;
wherein the application loader further operates to load the replacement component into the secure execution area in place of the at least one secure application component.

42. A system as claimed in claim 36, wherein the key management profile necessary for facilitating decryption is securely stored in the terminal.

43. A system as claimed in claim 36, wherein the key management profile necessary for facilitating decryption is obtained from a broadcast key information message.

44. A system as claimed in claim 36, wherein access to the key management profile is provided by a smartcard inserted in the terminal.

45. A system as claimed in claim 44, wherein the key management profile is securely stored on the smartcard.

46. A system as claimed in claim 36, wherein the key management profile includes rights objects and/or key stream messages that incorporate service keys.

47. A system as claimed in claim 46, wherein the service keys are securely stored in the secure area.

48. A system as claimed in claim 36, wherein the encrypted data received by the terminal is downloaded encrypted content, the key management profile being a rights object corresponding to the content and the temporary decryption information being a decryption key for decrypting the downloaded encrypted content.

49. A system as claimed in claim 36, wherein the encrypted data received by the terminal is broadcast data traffic, and the encrypted data traffic is decrypted in real time.

50. A user terminal incorporating the system as claimed in claim 36.

* * * * *